United States Patent
Szczepanski et al.

(10) Patent No.: US 12,480,685 B2
(45) Date of Patent: Nov. 25, 2025

(54) SHIELD FOR HVAC DRAIN PAN

(71) Applicant: Johnson Controls Tyco IP Holdings LLP, Milwaukee, WI (US)

(72) Inventors: Stephen C. Szczepanski, Wichita, KS (US); Debra S. Yates, Wichita, KS (US); Elmer Wayne Romero, Oxford, KS (US); Cole Brennan Morrow, Derby, KS (US); Johnny Huang, Wichita, KS (US); Xianjin Cheng, Andover, KS (US)

(73) Assignee: Johnson Controls Light Commerical IP GmbH, Schaffhausen (CH)

( * ) Notice: Subject to any disclaimer, the term of this patent is extended or adjusted under 35 U.S.C. 154(b) by 0 days.

(21) Appl. No.: 17/732,198

(22) Filed: Apr. 28, 2022

(65) Prior Publication Data
US 2022/0349617 A1    Nov. 3, 2022

Related U.S. Application Data

(60) Provisional application No. 63/182,274, filed on Apr. 30, 2021.

(51) Int. Cl.
*F24F 13/22* (2006.01)
*F24F 13/20* (2006.01)
*F24F 13/30* (2006.01)

(52) U.S. Cl.
CPC ............ *F24F 13/222* (2013.01); *F24F 13/20* (2013.01); *F24F 13/30* (2013.01)

(58) Field of Classification Search
CPC .......... F24F 13/222; F24F 13/20; F24F 13/22; F24F 13/30; F28F 17/005; F25D 21/14
See application file for complete search history.

(56) References Cited

U.S. PATENT DOCUMENTS

| 6,584,995 | B2 * | 7/2003 | Kimbrough ............... A61L 2/18 134/171 |
| 6,868,689 | B1 * | 3/2005 | McNeil .................. F24F 13/222 62/288 |
| 6,895,770 | B1 * | 5/2005 | Kaminski ............. F24F 13/222 62/285 |
| 6,978,909 | B2 | 12/2005 | Goetzinger et al. |
| 7,185,513 | B2 | 3/2007 | Bush et al. |
| 7,418,827 | B2 | 9/2008 | Rios |
| 8,220,282 | B2 | 7/2012 | Hast et al. |

(Continued)

FOREIGN PATENT DOCUMENTS

| WO | WO-2011072685 A1 * | 6/2011 | ............ F25B 39/028 |
| WO | WO-2013035130 A1 * | 3/2013 | ......... B60H 1/00785 |
| WO | WO-2017048236 A1 * | 3/2017 | ............. E21B 34/06 |

OTHER PUBLICATIONS

WO-2013035130-A1 English Translation (Year: 2013).*

*Primary Examiner* — Frantz F Jules
*Assistant Examiner* — Devon Moore
(74) *Attorney, Agent, or Firm* — Kelly McGlashen

(57) ABSTRACT

A drain pan for a heating, ventilation, and/or air conditioning (HVAC) system includes a trough defining a flow path and configured to direct condensate along the flow path, a shield disposed within the trough and having a body extending across the trough, and a notch formed in the shield and positioned in the flow path to enable flow of the condensate along the flow path and through the notch.

17 Claims, 9 Drawing Sheets

(56) References Cited

U.S. PATENT DOCUMENTS

| | | |
|---|---|---|
| D768,270 S | 10/2016 | Yamamoto et al. |
| 9,664,461 B2 | 5/2017 | Mercer et al. |
| 9,671,127 B2 | 6/2017 | Mercer et al. |
| 2012/0159981 A1 | 6/2012 | Beck et al. |
| 2015/0153055 A1* | 6/2015 | Oakner ................. F24F 11/001 |
| 2015/0153094 A1* | 6/2015 | Mercer ................. F24F 13/222 |
| | | 62/291 |
| 2018/0202685 A1* | 7/2018 | Pignolo ................. F24F 13/222 |
| 2023/0358591 A1* | 11/2023 | Coughlan ............. G01F 23/268 |

\* cited by examiner

SHIELD FOR HVAC DRAIN PAN

CROSS REFERENCE TO RELATED APPLICATIONS

This application claims priority from and the benefit of Provisional Application No. 63/182,274, entitled "INSERTABLE BYPASS SHIELD FOR CONDENSATE DRAIN PAN," filed Apr. 30, 2021, which is hereby incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to heating, ventilation, and/or air conditioning (HVAC) systems. A wide range of applications exist for HVAC systems. For example, residential, light commercial, commercial, and industrial systems are used to control temperatures and air quality in residences and buildings. Such systems often may perform heating and/or cooling functions. Very generally, these systems operate by implementing a thermal cycle in which fluids are heated and cooled to provide the desired temperature in a controlled space, such as within a residence or building. For example, a heat exchanger may place the fluid in a heat exchange relationship with an air flow to enable heat transfer between the fluid and the air flow in order to condition the air flow. The conditioned air flow may then be directed into the controlled space to condition the controlled space. Similar systems are used for vehicle heating and cooling and for general refrigeration. An HVAC system may utilize a drain pan to collect condensate formed via operation of a heat exchanger. It is presently recognized that improvements associated with operation of the drain pan are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a drain pan for a heating, ventilation, and/or air conditioning (HVAC) system includes a trough defining a flow path and configured to direct condensate along the flow path, a shield disposed within the trough and having a body extending across the trough, and a notch formed in the shield and positioned in the flow path to enable flow of the condensate along the flow path and through the notch.

In an embodiment, a heat exchanger system includes a heat exchanger and a drain pan engaged with the heat exchanger. The drain pan is configured to receive condensate from the heat exchanger, the drain pan defines a flow path configured to direct the condensate therethrough, the drain pan has a shield configured to be positioned within the flow path in an installed configuration of the shield, and the shield defines a passage configured to enable flow of the condensate therethrough in the installed configuration.

In an embodiment, a drain pan for a heating, ventilation, and/or heating (HVAC) system includes a shelf and an interior wall cooperatively forming a trough defining a flow path configured to direct condensate therethrough and a shield positioned in the flow path and extending across the trough, wherein the shield comprises a notch, and the flow path extends through the notch.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
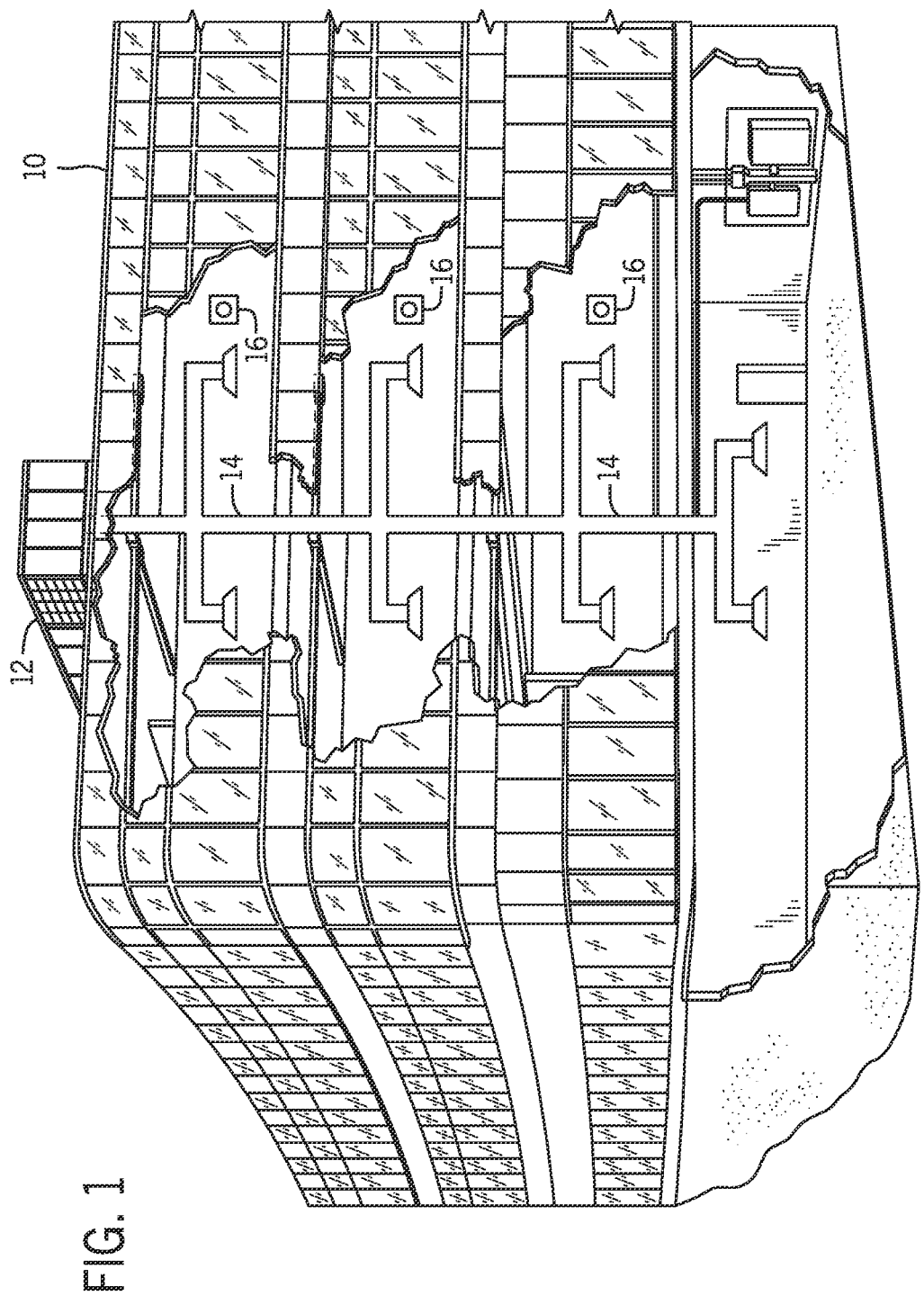
FIG. 1 is a perspective view of an embodiment of a heating, ventilation, and/or air conditioning (HVAC) system for building environmental management that may employ one or more HVAC units, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to heating, ventilation, and/or air conditioning (HVAC) systems that may include a condensate drain pan configured to collect condensate formed during operation of the HVAC system. For example, the HVAC system may include a heat exchanger through which refrigerant may flow. An air flow may be directed across the heat exchanger, and the heat exchanger may place the air flow in a heat exchange relationship with the refrigerant to enable heat transfer between the air flow and the refrigerant. For instance, the heat exchanger may be an evaporator in which the refrigerant may absorb heat from the air flow, thereby cooling the air flow. The air flow may then be directed to a space serviced by the HVAC system to condition the space.

In some instances, condensate may form on the heat exchanger. By way of example, cooling the air flow via the heat exchanger may condense moisture contained within the air flow to form condensate on the heat exchanger. For this reason, a condensate drain pan may be utilized to collect condensate formed on the heat exchanger, such as condensate that forms on and drips downward from fins of a tube and fin heat exchanger (e.g., via a gravitational force). The condensate drain pan may collect the condensate and facilitate directing the condensate to a desirable location, such as away from other equipment or components for controlled discharge from the HVAC system. Unfortunately, in some existing condensate drain pans, an air flow, such as the air flow directed across the heat exchanger, may disrupt, hinder, or impinge on directing the condensate via the condensate drain pan. For example, the air flow may be directed into the condensate drain pan and impede flow of the condensate toward a discharge opening of the condensate drain pan. As a result, the air flow may reduce effective operation of the condensate drain pan to remove condensate from the HVAC system.

Thus, it is presently recognized that improvements related to directing condensate via the condensate drain pan are desirable. Accordingly, embodiments of the present disclosure are directed to a condensate drain pan having a shield that mitigates disruption or impingement of condensate flow in the condensate drain pan caused by an air flow. For instance, the condensate drain pan may define a flow path through which the condensate may flow, such as toward the discharge opening. As an example, the condensate drain pan may have one or more condensate troughs (e.g., a pair of condensate troughs) defining a portion of the flow path. Each condensate trough may include a base surface along which the condensate may flow, and the base surface may be angled to facilitate directing the condensate along the flow path. Further, the condensate drain pan may include shields that extend across the condensate troughs. Each shield may include a notch or cutout defining a passage or opening that enables flow of condensate along the condensate troughs and through the shield. As such, the shield avoids impeding flow of condensate along the flow path. The shield may also block or impede air flow (e.g., the air flow directed across the heat exchanger) from affecting flow of the condensate along the flow path. For example, the shield may block air flow into certain portions of the flow path. Additionally or alternatively, the shield may reduce a velocity of the air flow directed into the flow path. Thus, the air flow may have a reduced effect on the flow of condensate. In this manner, the shield may block the air flow from inhibiting, displacing, or otherwise disrupting flow of the condensate along the flow path, thereby improving directing of the condensate via the condensate drain pan.

Turning now to the drawings, FIG. 1 illustrates a heating, ventilation, and/or air conditioning (HVAC) system for building environmental management that may employ one or more HVAC units. The HVAC system of FIG. 1 may also employ present embodiments to limit overflow of condensate into ductwork. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream. A heat exchanger of the HVAC unit 12, such as one in a refrigeration circuit, may cause generation of condensate that is collected and removed in accordance with embodiments of the presently disclosed drain system and shield.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
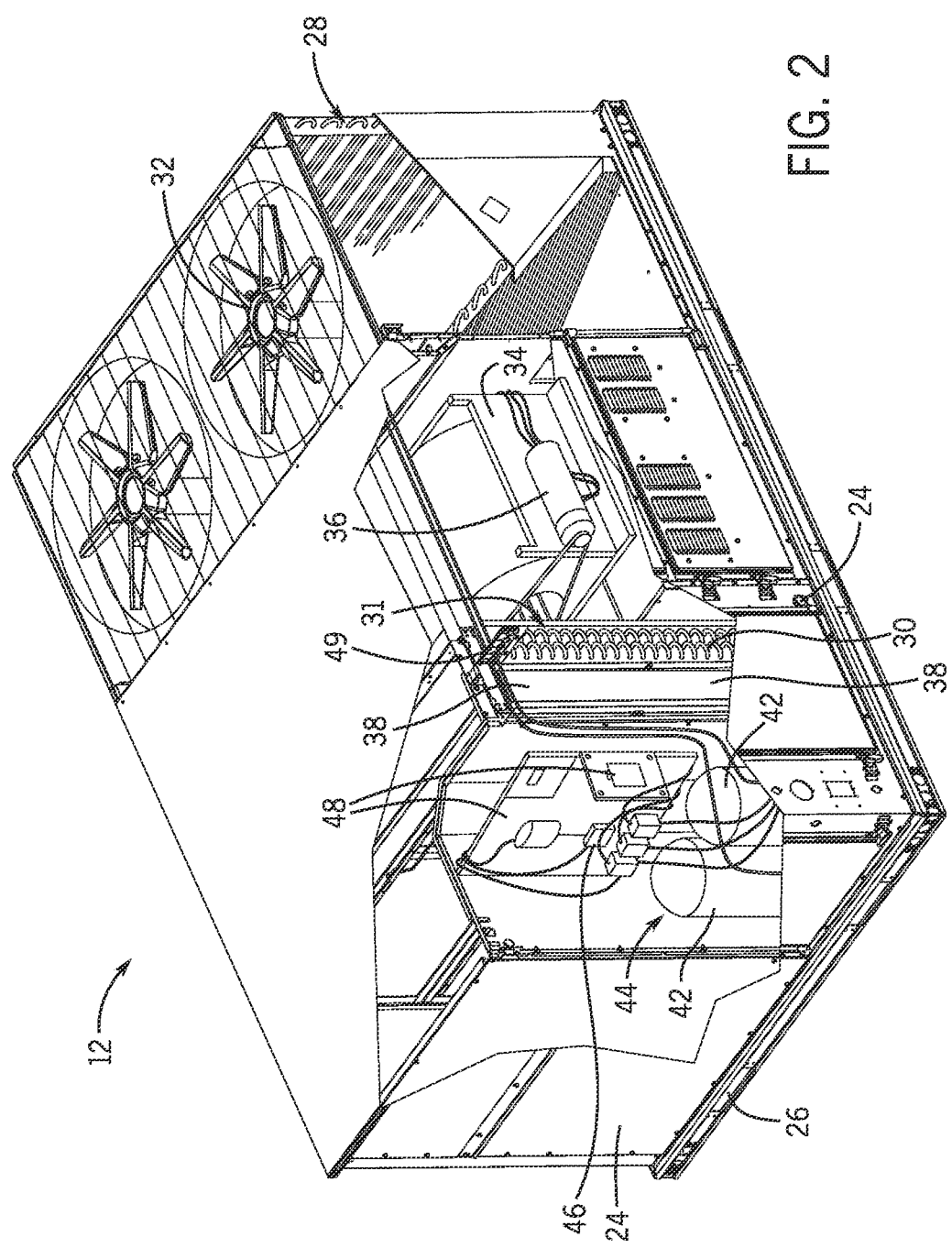
FIG. 2 is a perspective view of an embodiment of an HVAC unit of the HVAC system of FIG. 1, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Such heat exchangers may cause accumulation of condensate from environmental air that is addressed by embodiments of the presently disclosed drainage system. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
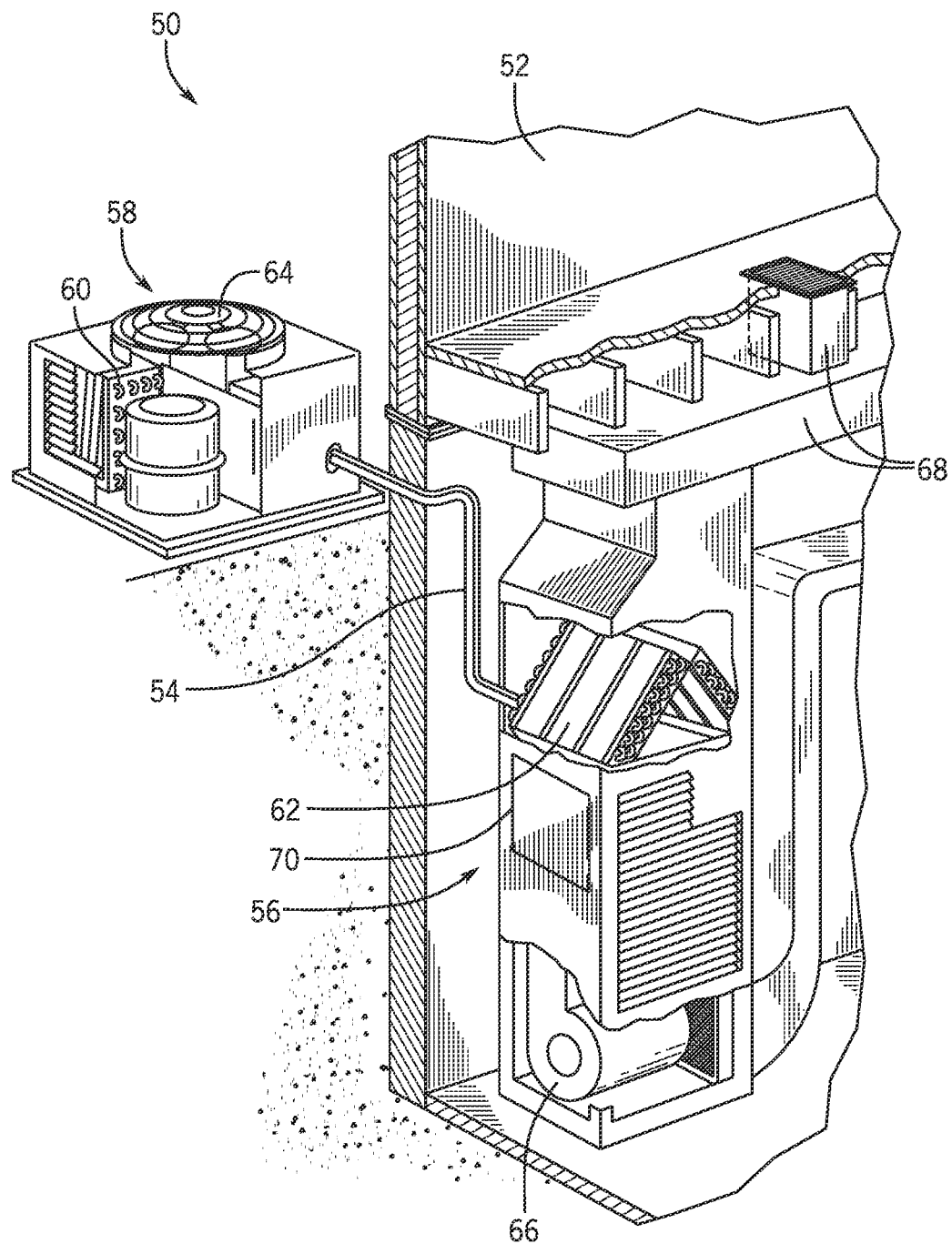
FIG. 3 is a perspective view of an embodiment of a residential split heating and cooling system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. In accordance with present embodiments, the indoor unit 56 includes a drain system in accordance with the present disclosure to limit or block condensate generated by cooling of atmospheric air, for example, from entering the ductwork 68. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
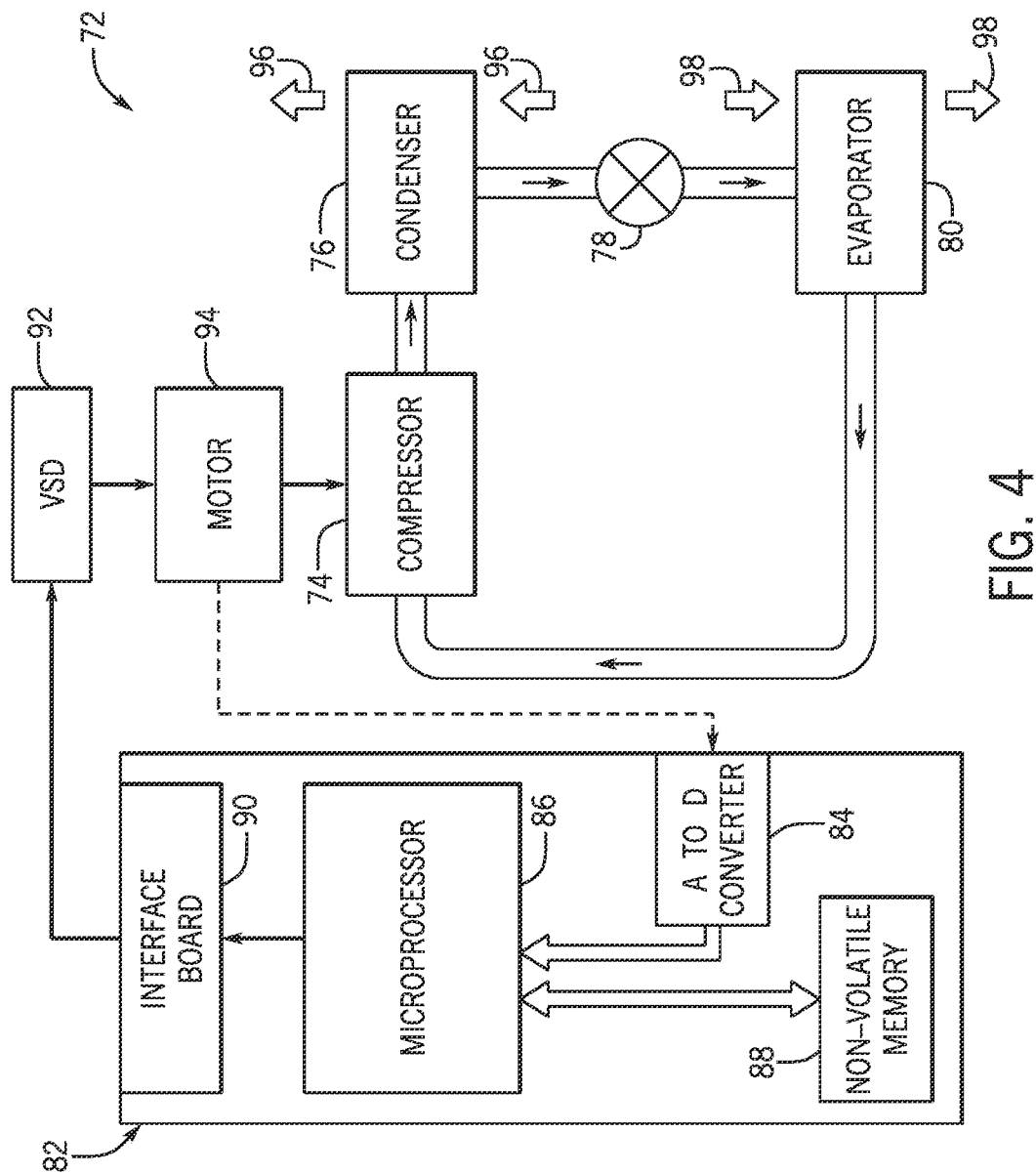
FIG. 4 is a schematic view of an embodiment of a vapor compression system that may be used in an HVAC system, in accordance with aspects of the present disclosure.

FIG. 4 is an embodiment of a vapor compression system 72 that can be used in any of the systems described above and incorporates one or more drainage system in accordance with present embodiments. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed below, an HVAC system, such as the HVAC unit 12, the residential heating and cooling system 50, and/or the vapor compression system 72, may utilize a heat exchanger, such as the heat exchanger 62 (e.g., a tube and fin heat exchanger), through which a refrigerant may flow. The HVAC system may utilize a condensate drain pan configured to receive condensate formed on the heat exchanger. The condensate drain pan may define a flow path along which the condensate may flow, such as toward a discharge opening for removal from the condensate drain pan. The condensate drain pan may include a shield disposed within the flow path. The shield may have a cutout or notch that enables flow of condensate through the shield and along the flow path.

Additionally, the shield may mitigate disruption of the condensate flow caused by an air flow, such as an air flow directed across the heat exchanger. For example, the shield may block the air flow from being directed into the flow path of the condensate and/or reduce a velocity of the air flow directed into the flow path. As a result, the shield may improve directing of the condensate along the flow path via the condensate drain pan.

Figure 5:
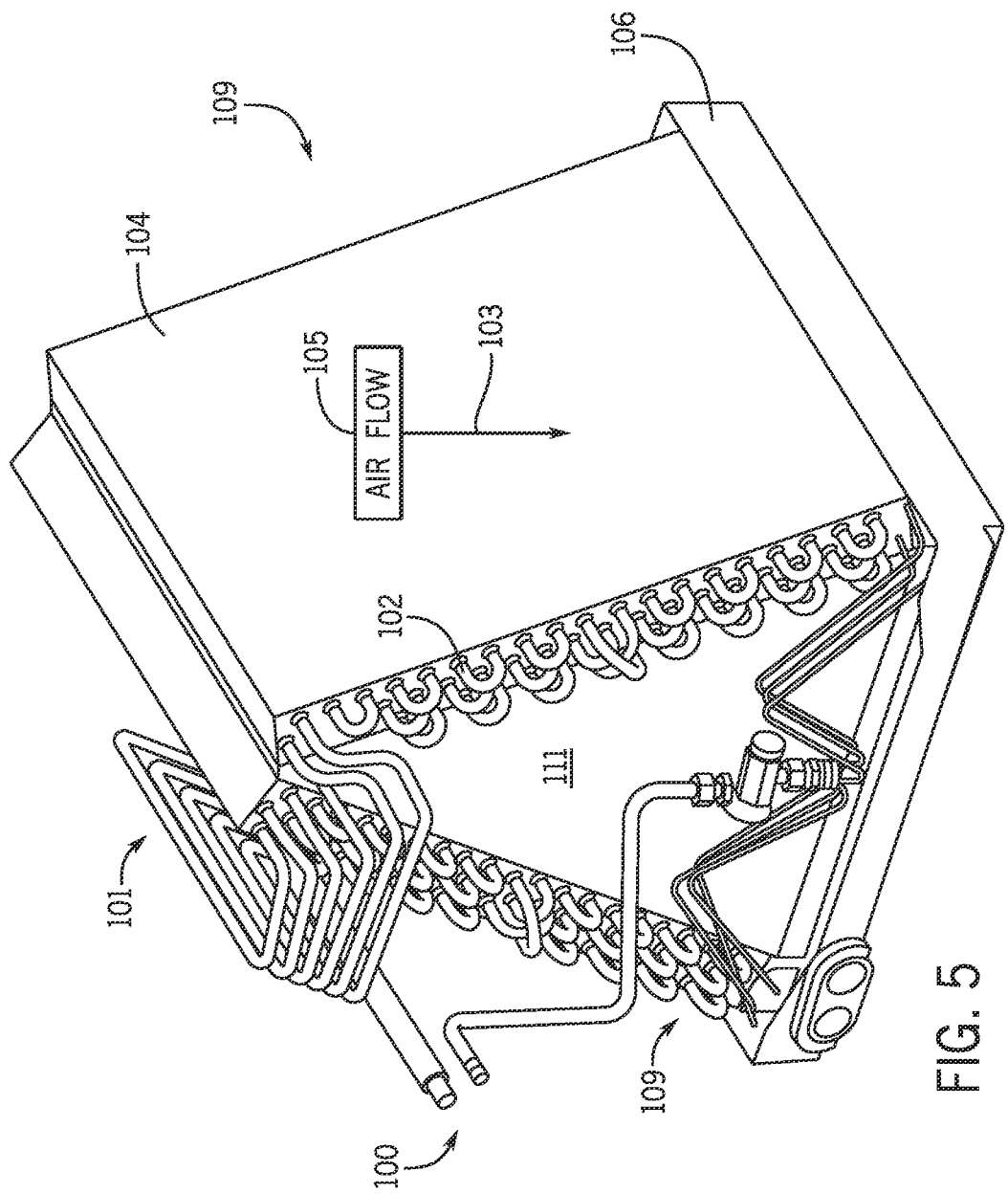
FIG. 5 is a perspective view of an embodiment of a heat exchanger system, in accordance with aspects of the present disclosure.

With this in mind, FIG. 5 is a perspective view of an embodiment of a heat exchanger system 100 including a drainage system in accordance with present embodiments. The heat exchanger system 100 may include a heat exchanger 101 configured to receive chilled refrigerant or other liquid through tubes 102 to condense, cool, and/or dehumidify air that is moved across the tubes 102. While any of various types of heat exchangers may be employed, the illustrated embodiment includes a fin and tube heat exchanger. However, it should be understood that the features described herein may apply to other types of heat exchanger embodiments as well.

In the illustrated embodiment, an air flow 105 (e.g., a supply air flow) may be drawn or forced across the heat exchanger system 100 in a direction 103 by an air mover, such as the blower or fan 66. For example, the air flow 105 may be directed across the tubes 102 and/or fins 104 coupled to the tubes 102. The tubes 102 and/or the fins 104 may enable heat transfer between the air flow 105 and refrigerant directed through the tubes 102. For instance, as the air flow 105 moves across the tubes 102, the refrigerant may absorb heat from the air flow 105, thereby cooling the air flow 105. Cooling of the air flow 105 may cause moisture or water within the air flow 105 to condense and gather onto the tubes 102 and/or the fins 104. As the water from the air continues to condense, the condensate or condensed water may drop along the tubes 102 and/or the fins 104 onto a drain pan 106 (e.g., a condensate drain pan) of the heat exchanger system 100. As an example, the drain pan 106 may be positioned vertically below the tubes 102 to enable a gravitational force to direct the condensate onto the drain pan 106. Additionally, the air flow 105 may force the condensate off the tubes 102 and onto the drain pan 106. In any case, condensate may accumulate within the drain pan 106.

The heat exchanger system 101 includes multiple slabs 109 in the illustrated embodiment. For example, the slabs 109 may be coupled to one another and oriented crosswise to form an A-shape or V-shape arrangement. Each slab 109 may include the tubes 102 and the fins 104 coupled to the tubes 102. In certain embodiments, refrigerant may be directed through the slabs 109 in a parallel flow arrangement. For example, refrigerant may be apportioned such that separate flows of refrigerant may be directed through one of the slabs 109 and not the other of the slabs 109. In additional or alternative embodiments, refrigerant may be directed through the slabs 109 in a series flow arrangement. That is, refrigerant may flow sequentially through the slabs 109. The air flow 105 may be directed across each of the slabs 109 and into a space 111 (e.g., an internal space) formed between the slabs 109. For example, the air flow 105 may be directed from the space 111 into ductwork (e.g., an air flow conduit) configured to direct the air flow 105 into a space serviced by the HVAC system in which the heat exchanger system 100 is implemented.

Each slab 109 may engage with the drain pan 106. As an example, the drain pan 106 may include surfaces (not shown), and each slab 109 may engage with, abut against, contact, or rest upon the surfaces. Furthermore, although the illustrated heat exchanger 101 includes two slabs 109, an additional or alternative heat exchanger 101 may include any suitable number of slabs 109, such as a single slab 109, more than two slabs 109 (e.g., three slabs forming an N-shape or Z-shape arrangement), and so forth, on which condensate may form. Further still, the heat exchanger 101 may include any other suitable features (e.g., a baffle, an enclosure), and condensate may form on such features and flow into the drain pan 106.

Figure 6:
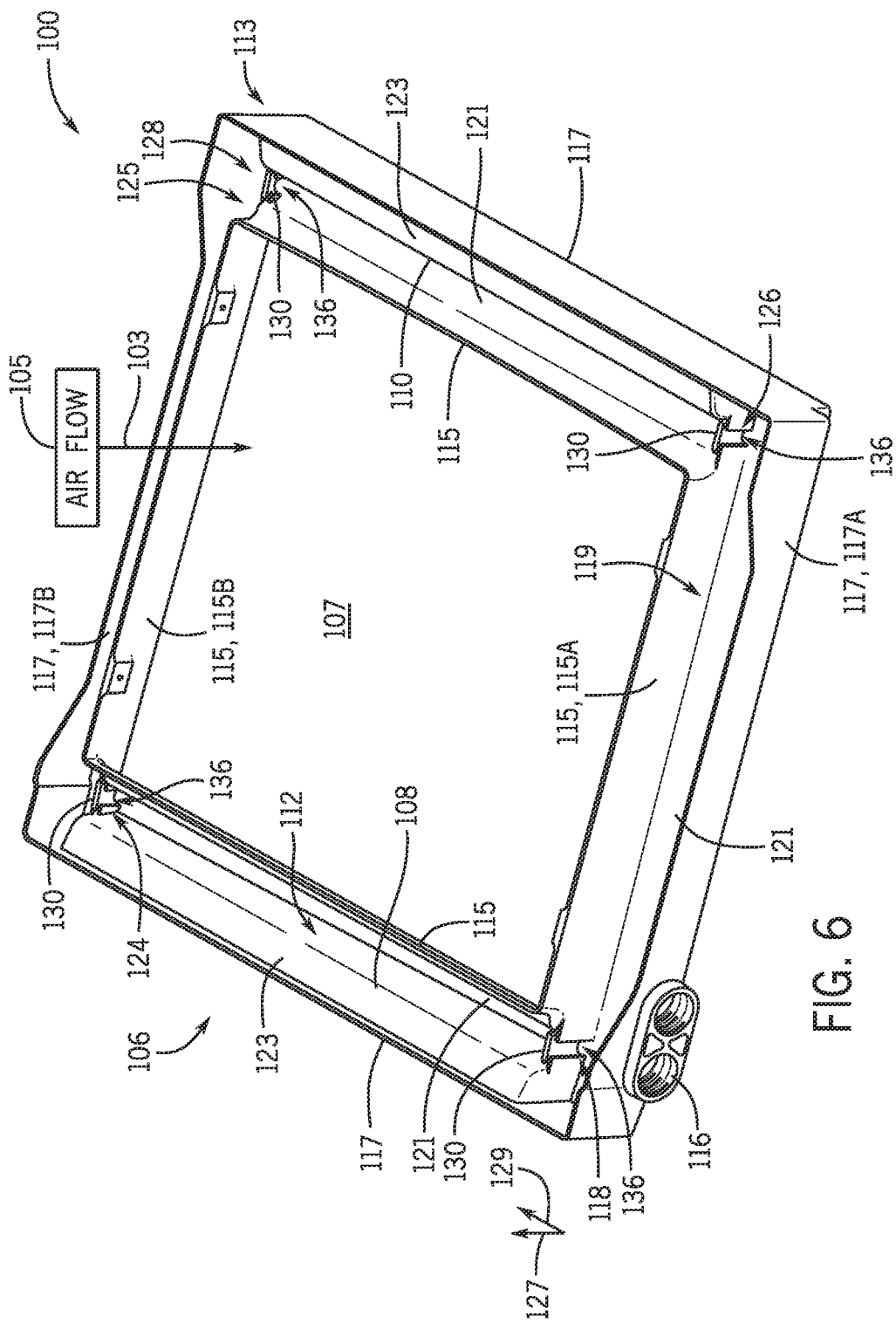
FIG. 6 is a perspective view of an embodiment of a condensate drain pan of the heat exchanger system of FIG. 5 with a shield configured to improve condensate flow in the condensate drain pan, in accordance with aspects of the present disclosure.

FIG. 6 is a perspective view of an embodiment of the drain pan 106 of the heat exchanger system 100 of FIG. 5. The drain pan 106 may receive condensate from the heat exchanger 101 (e.g., the tubes 102 and/or fins 104) as cooled air travels through the heat exchanger system 100. For example, the drain pan 106 may define a duct opening 107 fluidly coupled to a conditioned space of a structure or building (e.g., via ductwork), and the air flow 105 may be directed through the duct opening 107, such as via the space 111 between the slabs 109 of the heat exchanger 101, and toward the conditioned space. The drain pan 106 may include a body 113 and a first shelf 108 and a second shelf 110 extending from the body 113. For example, the first shelf 108 and the second shelf 110 may be positioned on opposite sides of the duct opening 107. In certain embodiments, the shelves 108, 110 may be integrally formed with the body 113, such as by bending sheet metal and/or via an injection molding process that concurrently forms the shelves 108, 110 and the body 113. In additional or alternative embodiments, the shelves 108, 110 may be a separate component of the body 113 and may be attached to the body 113, such as via a weld, a fastener, an adhesive, or another coupling feature. The shelves 108, 110 may engage with the slabs 109 of the heat exchanger 101 in an assembled configuration of the heat exchanger system 100 to couple the drain pan 106 to the heat exchanger 101.

The body 113 may include interior walls 115 connected to one another to cooperatively define the duct opening 107. The interior walls 115 may block flow of condensate from the body 113 into the duct opening 107. Additionally, the body 113 may include exterior walls 117 that may block flow of condensate from the body 113 out of the drain pan 106. In this way, the interior walls 115 and the exterior walls 117 may contain or hold the condensate within the drain pan 106. For example, the drain pan 106 may include a discharge opening 116 (e.g., formed through one of the exterior walls 117), and the drain pan 106 may direct the condensate toward the discharge opening 116. For instance, a drain pipe may be fluidly coupled to the drain pan 106 via the discharge opening 116, and the drain pan 106 may direct the condensate into the drain pipe for removal of the condensate from the heat exchanger system 100. By way of example, the drain pipe may direct the condensate away from other equipment or sections of the HVAC system, away from the space conditioned by the HVAC system, and so forth, for controlled removal from the HVAC system.

Each shelf 108, 110 may be configured to engage a corresponding exterior wall 117 (e.g., lateral exterior walls) in an assembled configuration of the heat exchanger system 100. As an example, each shelf 108, 110 may extend from one of the exterior walls 117 toward a corresponding one of the interior walls 115 (e.g., lateral interior walls) facing the exterior wall 117. As such, the shelf 108, 110 and the interior walls 115 may define troughs, channels, or gaps extending between the shelves 108, 110 and the interior walls 115. That is, the first shelf 108 and corresponding interior wall 115 may form a first trough 112 extending along the first shelf 108, and the second shelf 110 and corresponding interior wall 115 may form a second trough 114 extending along the second shelf 110. The first trough 112 and the second trough 114 may be positioned at opposite sides of the duct opening 107 and may each define a flow path through which condensate may flow.

Additionally, in the illustrated embodiment, the discharge opening 116 is formed on a first exterior wall 117A (e.g., a longitudinal exterior wall). The first exterior wall 117A and a first interior wall 115A facing the first exterior wall 117A may define a third trough 119. The third trough 119 may define a portion of the flow of the condensate and may receive condensate from the first trough 112 and the second trough 114. For example, condensate may flow along a base surface 121 of the body 113 within the first trough 112 toward the third trough 119 and along the base surface 121 within the second trough 114 toward the third trough 119 in parallel with one another, and the base surface 121 of the third trough 119 may direct the condensate toward the discharge opening 116 for discharge from the drain pan 106. To this end, the base surfaces 121 within the troughs 112, 114 may be angled or sloped (e.g., downwardly toward the third trough 119) to enable a gravitational force to guide the flow of condensate into the third trough 119. Additionally, the base surface 121 within the third trough 119 may be angled or sloped (e.g., downwardly toward the discharge opening 116) to enable the gravitational force to guide the flow of condensate toward the discharge opening 116 within the third trough 119.

Moreover, the shelves 108, 110 may have interface surfaces 123 (e.g., top surfaces) that may engage with the slabs 109 of the heat exchanger 101 in the assembled configuration. The interface surfaces 123 may be angled or extend crosswise (e.g., downwardly from the exterior wall 117 toward the base surface 121 within a corresponding trough 112, 114) to facilitate directing condensate from shelves 108, 110 into the troughs 112, 114. In this manner, condensate formed on the heat exchanger 101 may flow along the flow path from the heat exchanger 101 onto the interface surfaces 123 of the shelves 108, 110, through the troughs 112, 114, through the third trough 119, and through the discharge opening 116.

The drain pan 106 may also define a fourth trough 125 via a second interior wall 115B and a second exterior wall 117B facing the second interior wall 115B, and the fourth trough 125 and the third trough 119 may be positioned at opposite sides of the duct opening 107. In certain embodiments, an additional discharge opening may be formed at the fourth trough 125 (e.g., through the second exterior wall 117B), and the troughs 112, 114 may also direct condensate into the fourth trough 125 for discharge via such a discharge opening 116. For example, a portion of the base surfaces 121 within the troughs 112, 114 may be sloped to guide condensate toward the third trough 119, and another portion of the base surfaces 121 within the troughs 112, 114 may be sloped to guide condensate toward the fourth trough 125. In additional or alternative embodiments, the fourth trough 125 may be arranged (e.g., angled) to direct condensate into the troughs 112, 114 for flow toward the third trough 119. In further embodiments, the drain pan 106 may have a different arrangement to direct condensate in a different manner. For instance, the drain pan 106 may have a different shape or geometry than illustrated in FIG. 6, such as a circular arrangement in which condensate may be directed about a circumference of the drain pan 106.

The drain pan 106 may further include shields 130 that may be positioned within the flow path defined by the troughs 112, 114, 119, 125. For example, the first trough 112 may include a first trough opening 118 on the end of the first trough 112 that interfaces with the third trough 119 to enable flow of condensate between the first trough 112 and the third trough 119 along the flow path. A shield 130 may extend across the first trough opening 118. The first trough 112 may also include a second trough opening 124 on the end opposite of the first trough opening 118, such as the end of the first trough 112 that interfaces with the fourth trough 125 to enable flow of condensate between the first trough 112 and the fourth trough 125 along the flow path. Another shield 130 may extend across the second trough opening 124. Similarly, the second trough 114 may include a third trough opening 126 on the end of the second trough 114 that interfaces with the third trough 119 to enable flow of condensate between the second trough 114 and the third trough 119 along the flow path, and the second trough 114 may include a fourth trough opening 128 on the opposite end that interfaces with the fourth trough 125 to enable flow of condensate between the second trough 114 and the fourth trough 125 along the flow path. Respective shields 130 may extend across each of the third trough opening 126 and the fourth trough opening 128.

Each shield 130 may extend across the trough openings 118, 124, 126, 128 from one of the shelves 108, 110 to an interior wall 115. Additionally, each shield 130 may extend along a first axis 127 (e.g., a vertical axis along which the air flow 105 may be directed in the direction 103) along the shelves 108, 110 and/or the interior wall 115. Thus, the shields 130 may block or reduce air flow (e.g., the air flow 105) through the trough openings 118, 124, 126, 128. Such arrangement of the shields 130 may impede or mitigate the air flow from affecting flow of condensate through the flow path. As further described below, an air flow may flow in a direction toward the trough openings 118, 124, 126, 128, such as along a second axis 129 (e.g., a longitudinal axis). The shield 130 may block such a flow of air from being directed into a portion of the flow path (e.g., within the troughs 112, 114), such as in a direction against the flow of condensate toward the discharge opening 116. As another example, the shield 130 may block air from flowing into the flow path at above a threshold speed that would cause condensate to flow out of the flow path (e.g., by causing the condensate to splash and flow out of the flow path, such as over the interior walls 115 and/or the exterior walls 117). Thus, the shield 130 may improve flow of condensate that may otherwise be disrupted via an air flow.

Moreover, each shield 130 may include a notch or cutout 136 positioned in the flow path. The notch 136 may enable condensate flow along the flow path and through the shield 130. By way of example, the notch 136 may form a passage that enables flow of condensate along the base surfaces 121 and through the trough openings 118, 126, 124, 128. Thus, condensate may flow between the first trough 112 and the third trough 119, between the second trough 114 and the third trough 119, between the first trough 112 and the fourth trough 125, and/or between the second trough 114 and the fourth trough 125 via the respective notches 136 of the shields 130. In this manner, the shield 130 may avoid impeding or blocking flow of condensate through the flow path, while mitigating disruption of the flow of condensate through the flow path caused by an air flow. Thus, the shield 130 may improve desirable flow of the condensate through the drain pan 106, such as toward and/or through the discharge opening 116.

In certain embodiments, the shields 130 may be separately formed from the drain pan 106. In such embodiments, the shields 130 may be selectively implemented into different parts of the drain pan 106. By way of example, the shields 130 may be readily positioned at any combination of the trough openings 118, 124, 126, 128. In some embodiments, the shields 130 may also be selectively removed from the drain pan 106, such as for maintenance, replacement, and/or repair of the shields 130. In additional or alternative embodiments, the shields 130 may be integrally formed with the drain pan 106. For example, the shields 130 may be formed with the shelves 108, 110 and/or with the interior walls 115 to extend across the trough openings 118, 124, 126, 128.

Figure 7:
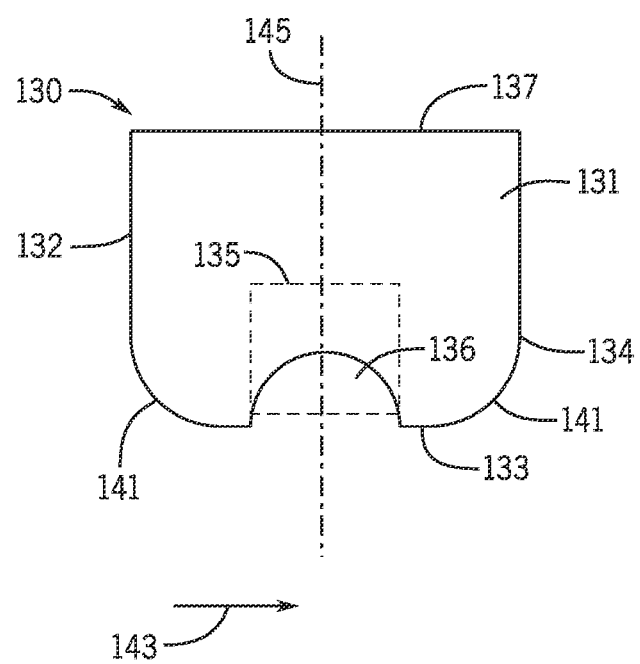
FIG. 7 is a front view of an embodiment of a shield that may be implemented in the condensate drain pan of FIG. 6, in accordance with aspects of the present disclosure.

FIG. 7 is a front view of an embodiment of the shield 130. The illustrated embodiment of the shield 130 may be separately formed from the drain pan 106 and may therefore be selectively implemented at any the trough openings 118, 124, 126, 128. As an example, the shield 130 may be an insert that may be inserted into recesses of the shelves 108, 110 and/or of the interior walls 115 for securement at the trough openings 118, 124, 126, 128. In some embodiments, the shield 130 may be a planar or generally flat member having a limited thickness dimension.

The shield 130 may include a body 131 having a first edge 132 (e.g., a first lateral edge) and a second edge 134 (e.g., a second lateral edge). The first edge 132 may engage with one of the shelves 108, 110, and the second edge 134 may engage with one of the interior walls 115 such that the shield 130 extends across the trough openings 118, 124, 126, 128 (e.g., from the interior walls 115 to a corresponding shelf 108, 110). The body 131 may also include a third edge 133 extending between the first edge 132 and the second edge 134. The notch 136 may be formed in the third edge 133 (e.g., extending inwardly from the third edge 133) and through a thickness of the shield 130. The notch 136 may enable condensate to flow through the shield 130 (e.g., through the thickness of the shield 130), such as along the base surfaces 121 of the drain pan 106. For instance, in an installed configuration of the shield 130 in the drain pan 106, in which the shield 130 may be positioned in the flow path of the condensate, the third edge 133 at the notch 136 may extend over the base surface 121 of the drain pan 106 such that the flow path extends through the notch 136. As such, condensate may flow along the base surface 121 and under the third edge 133 within the notch 136 to flow through the shield 130. In this manner, the shield 130 may enable flow of condensate through the flow path via the notch 136.

In the illustrated embodiment, the notch 136 has a semi-circular geometry. In additional or alternative embodiments, the notch 136 may have any suitable shape, such as a rectangular shape, a triangular shape, an irregular shape, and so forth. In further embodiments, the notch 136 may be formed in any other edge of the shield 130, such as in the first edge 132 and/or the second edge 134. Moreover, in some embodiments, the shield 130 may include a gate 135 (shown in phantom lines) that may be configured to adjust a size of the passage defined by the notch 136 and exposed to enable flow of condensate through the notch 136. For instance, the gate 135 may be adjusted to increase the size of the passage or opening provided by the notch 136 to enable increased flow (e.g., an increased flow rate) of condensate through the notch 136. The gate 135 may also be adjusted to reduce the size of the passage to reduce flow (e.g., reduce the flow rate) of condensate through the notch 136. To this end, the gate 135 may be coupled to the body 131 and may be movable (e.g., manually movable) to adjust an overlap with the notch 136 to cover or expose a desirable amount of the notch 136. For example, the gate 135 may include a latch, a slide, a flap, a clip, and so forth, which may be attached to the body 131. The gate 135 may translate (e.g., slide), rotate, or otherwise be adjusted relative to the body 131 to change the amount of the notch 136 covered by the gate 135.

In the illustrated embodiment, the third edge 133 includes respective arcuate portions 141 extending from the first edge 132 and the second edge 134 to the notch 136. The arcuate portions 141 may enable desirable positioning of the shield 130 within the trough openings 118, 124, 126, 128. As an example, the shelves 108, 110 and/or the interior walls 115 may have respective surfaces that curvedly extend to the base surfaces 121, and the arcuate portions 141 may engage with the curved surfaces and to the base surface 121. In this manner, the third edge 133 may accommodate a profile of the shelves 108, 110 and/or the interior walls 115 to be positioned against (e.g., flush with) the shelves 108, 110, the interior walls 115, and/or the base surface 121, thereby enabling the shields 130 to be sufficiently positioned within the trough openings 118, 124, 126, 128. For this reason, the third edge 133 may have different features (e.g., linear portions, sloped portions, corners, step profiles) for drain pans 106 having different profiles to enable sufficient engagement between the shields 130 and the shelves 108, 110 and/or the interior walls 115.

The shield 130 may also include a fourth edge 137 extending from the first edge 132 to the second edge 134. The fourth edge 137 extends linearly, such as along a third axis 143 (e.g., a lateral axis), in the illustrated embodiment. However, in an additional or alternative embodiment, the fourth edge 137 may extend in a different manner, such as along an axis crosswise to the third axis 143 and/or in a non-linear manner.

In some embodiments, an opening may be formed internally at the body 131 in addition to or as an alternative to the notch 136 formed in the third edge 133. That is, the opening may be positioned inwardly with respect to the first edge 132, the second edge 134, the third edge 133, and the fourth edge 137. For example, in such embodiments, an entirety of the third edge 133 may abut against (e.g., be flush with) the shelves 108, 110, the base surface 121, and/or the interior wall 115. Such an opening may enable flow of condensate therethrough, such as over the third edge 133 and into the opening, to enable flow of condensate through the shield 130 and along the flow path.

The shield 130 may further have any other suitable shape, geometry, and/or profile. As an example, the shield 130 may be asymmetrical about a center axis 145 extending through a center of the body 131. The shield 130 may also include a different number of edges, such as three edges, five edges, or six or more edges, to facilitate positioning of the shield 130, directing flow of condensate, and/or blocking or reducing flow of air.

The shield 130 may be formed of any suitable material, such as a polymer, a metal, a composite, or any other suitable material providing sufficient strength and/or rigidity to withstand the flow of condensate and/or air against the body 131. Such material may also be oxidation-resistant to mitigate structural changes caused by contact with the condensate to improve a structural integrity and increase a useful lifespan of the shield 130. The shield 130 may also be coated with a material to increase oxidation resistance. For example, the coating may include a paint, a ceramic, a powdered material, or another material suitable.

Figure 8:
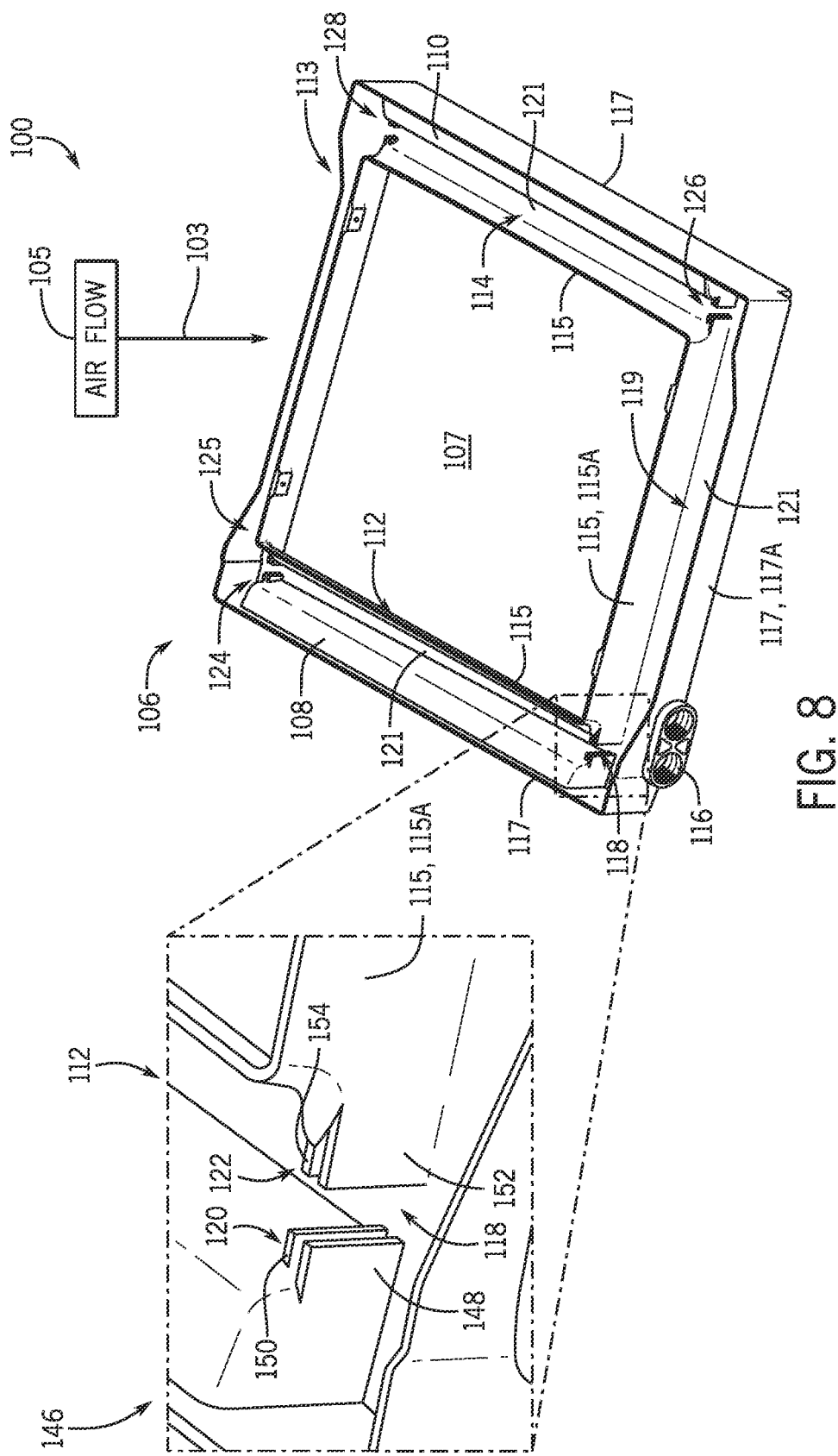
FIG. 8 is a perspective view of an embodiment of a condensate drain pan, with a detailed view of a trough opening of the condensate drain pan, in accordance with aspects of the present disclosure.

FIG. 8 is a perspective view of an embodiment of the drain pan 106. FIG. 8 also includes a detailed view 146 of the first trough opening 118. However, features described herein may also be implemented in the second trough opening 114, the third trough opening 126, and/or the fourth trough opening 128. In the illustrated embodiment, the first shelf 110 forms a first channel, recess, or slot 120, which may extend transversely relative to the flow path extending through the first trough opening 118. For example, the first shelf 110 may include a first extension 148 and a second extension 150 extending into the first trough 112 (e.g., into the first trough opening 118) to form the first channel 120. In the installed configuration of the shield 130, the first edge 132 may be inserted into the first channel 120 to secure the shield 130 to the first shelf 110. For instance, the first extension 148 and the second extension 150 of the first shelf 110 may cooperatively capture the body 131 of the shield 130 at the first edge 132, such as via an interference fit (e.g., a slip fit, a press fit). Additionally, the interior walls 115 (e.g., the first interior wall 115A) may include a first extension 152 and a second extension 154 extending into the first trough 112 to form a second channel, recess, or slot 122, which may extend transversely relative to the flow path extending through the first trough opening 118. In the installed configuration of the shield 130, the second edge 134 may be inserted into the second channel 122 such that the first extension 152 and the second extension 154 of the interior walls 115 cooperatively capture the body 131 of the shield 130 at the second edge 134, thereby securing the shield 130 to the interior walls 115. In this manner, the channels 120, 122 may cooperatively secure the shield 130 in the first trough opening 118.

In some embodiments, the fourth edge 137 of the shield 130 may be positioned clear of (e.g., extend above) the extensions 148, 150 of the first shelf 108 and/or clear of the extensions 152, 154 of the interior walls 115. For example, such positioning of the fourth edge 137 may facilitate removal (e.g., manual removal) of the shield 130 from the channels 120, 122 to uninstall the shield 130, such as for maintenance, replacement, and/or repair of the shield 130. For instance, the shield 130 may be extend external to the channels 120, 122 in order to provide increased access to the fourth edge 137. In this manner, the shield 130 may be more readily accessible by a user for removal, such as by gripping the shield 130 at the fourth edge 137 to impart a force that moves the shield 130 out of the channels 120, 122.

Other features may also be utilized to facilitate securement of the shield 130 at the first trough opening 118. By way of example, a fastener, an adhesive, a magnet, a weld, and so forth, may be used to supplement securement provided via the channels 120, 122 or as an alternative to the channels 120, 122. In any case, in the installed configuration of the shield 130, movement of the shield 130 (e.g., out of the first trough opening 118) relative to the first shelf 108 and/or the interior walls 115 may be restricted or blocked, thereby enabling the shield 130 to operate to facilitate flow of condensate through the flow path.

Figure 9:
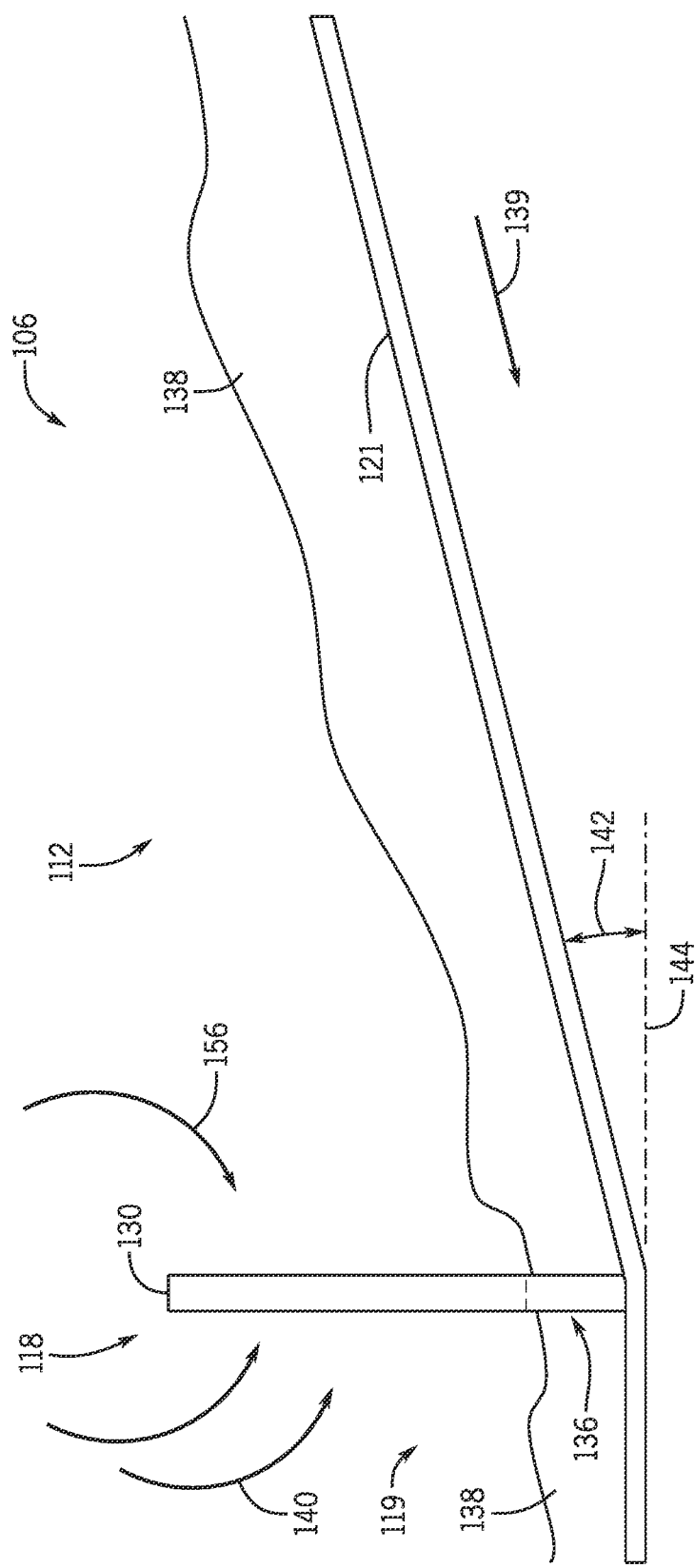
FIG. 9 is a side view of an embodiment of the condensate drain pan of FIG. 6 with a shield configured to improve condensate flow in the condensate drain pan, in accordance with aspects of the present disclosure.

FIG. 9 is a side view of an embodiment of the drain pan 106, such as of a portion of the first trough 112 (e.g., the first trough opening 118) and the third trough 119 at which the shield 130 may be positioned. However, the description herein may apply to any suitable portion of the drain pan 106 where the shield 130 may be positioned. Additionally, it should be noted that certain components and features, such as the first shelf 108, the interior walls 115, and the exterior walls 117, are not illustrated for visualization purposes. The base surface 121 of the drain pan 106 within the first trough 112 may be sloped at an angle 142 (e.g., an oblique angle) with respect to a horizontal plane 144 (e.g., extending along the second axis 129) to direct condensate 138 (e.g., via a gravitational force) in a direction 139 along the base surface 121, through the flow path in the first trough 112, and toward the third trough 119. As an example, the angle 142 may be between 3 and 5 degrees, 1 and 3 degrees, or more than 5 degrees to direct condensate 138 in a desirable manner, such as at a desirable flow rate and/or flow velocity. The notch 136 of the shield 130 may enable the condensate 138 to flow through the shield 130, such as from the first trough 112 into the third trough 119. However, the shield 130 may block an air flow (e.g., the air flow 105) from affecting such flow of the condensate 138 along the flow path.

For instance, during operation of the HVAC system, portions of the air flow 105 may be directed toward the first trough 112 and/or the third trough 119. As an example, a portion of the air flow 105 may bypass the slabs 109 of the heat exchanger 101 and flow in first directions 140 toward the drain pan 106. The shield 130 may block such flow of air from disrupting flow of the condensate 138 through the flow path. For example, the shield 130 may block (e.g., decelerate) flow of air in the first directions 140 into the first trough 112 and/or into the third trough 119 and against (e.g., generally opposite to) the direction 139 in which the condensate 138 flows along the base surface 121. Thus, the shield 130 may enable the condensate 138 to flow more readily and uninterruptedly from the first trough 112 to the third trough 119. As another example, a portion of the air flow 105 may bypass the slabs 109 and/or deflect off the slabs 109 and flow in second directions 156 toward the drain pan 106. The shield 130 may block (e.g., decelerate) such flow of air into the first trough 112 and/or third trough 119 and, for instance, cause the condensate 138 to flow out of the drain pan 106 (e.g., by splashing the condensate 138 flowing through the flow path). As such, the shield 130 may improve flow of the condensate 138 through the drain pan 106, such as toward the discharge opening 116 at the third trough 119 for discharge from the heat exchanger system 100.

Accordingly, the present disclosure is directed to an HVAC system that includes a heat exchanger system having a heat exchanger and a drain pan. The drain pan may receive condensate formed on the heat exchanger and direct the condensate for discharge from the heat exchanger system. For example, the drain pan may include a trough defining a flow path of the condensate. Additionally, the drain pan may include a shield positioned in the flow path. The shield may reduce or mitigate disruption of the condensate flow caused by an air flow. For instance, the shield may block the air flow from being directed into the flow path. Thus, the shield may block such air flow from impinging on the flow of the condensate along the flow path. Moreover, the shield may include a notch or cutout defining a passage through which the condensate may flow. As an example, the passage may enable flow of condensate along the flow path and through the shield. Thus, the shield may avoid blocking or reducing flow of condensate along the flow path. In this manner, the shield may improve flow of condensate through the drain pan, such as for discharge from the heat exchanger system.

While only certain features and embodiments of the present disclosure have been illustrated and described, many modifications and changes may occur to those skilled in the art, such as variations in sizes, dimensions, structures, shapes and proportions of the various elements, values of parameters, such as temperatures or pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A drain pan for a heating, ventilation, and/or air conditioning (HVAC) system, comprising:
    a trough defining a flow path, wherein the trough is configured to direct condensate along the flow path;
    a base surface within the trough, wherein the base surface is configured to direct the condensate along the flow path;
    an interior wall and a shelf cooperatively defining the trough, wherein the interior wall defines a first channel extending transverse to the flow path, and wherein the shelf comprises a surface angled toward the base surface and the shelf defines a second channel extending transverse to the flow path;
    a shield disposed within the trough, wherein the shield comprises:
        a body extending across the trough from the interior wall to the shelf, and the body extends within the first channel and the second channel; and
        a gate coupled to the body; and
        a notch formed in an edge of the shield and positioned in the flow path to enable flow of the condensate along the flow path and through the notch, wherein the edge of the shield abuts the base surface of the trough, the notch extends from the edge into the body of the shield, and the gate is movable relative to the body to adjust an overlap with the notch and adjust the flow of the condensate through the notch.

2. The drain pan of claim 1, wherein the notch defines a passage that enables the flow of the condensate along the base surface through the notch.

3. The drain pan of claim 1, wherein the shelf and the interior wall comprise respective curved surfaces that extend to the base surface, and the edge of the shield comprises arcuate portions configured to engage with the respective curved surfaces of the shelf and the interior wall.

4. The drain pan of claim 1, wherein the surface is an interface surface configured to engage with a heat exchanger, receive the condensate from the heat exchanger, and direct the condensate into the trough.

5. The drain pan of claim 1, wherein the trough is a first trough, the drain pan comprises a second trough defining the flow path, the first trough comprises a trough opening configured to enable the flow of the condensate between the first trough and the second trough along the flow path, and the shield is positioned at the trough opening.

6. The drain pan of claim 3, comprising a discharge opening formed at the second trough, wherein the drain pan is configured to discharge the condensate via the discharge opening.

7. A heat exchanger system, comprising:
    a heat exchanger; and
    a drain pan engaged with the heat exchanger, wherein the drain pan is configured to receive condensate from the heat exchanger, the drain pan comprises a base surface that defines a flow path configured to direct the condensate therethrough, the drain pan comprises a shield configured to be positioned within the flow path in an installed configuration of the shield, and the shield comprises:
        a body configured to extend across the flow path and block air flow into the flow path in the installed configuration;
        an edge configured to extend across the flow path and abut the base surface of the drain pan in the installed configuration;
        a notch formed in the edge of the shield and extending from the edge into the body of the shield; and
        a gate coupled to the body, wherein the gate is movable relative to the body to adjust an overlap with the notch and to adjust flow of the condensate through the notch.

8. The heat exchanger system of claim 7, wherein the base surface is sloped to direct the condensate through the flow path.

9. The heat exchanger system of claim 7, wherein the drain pan comprises an interior wall and a shelf cooperatively forming a trough that defines the flow path, and the shield is configured to extend from the interior wall, across the trough, and to the shelf.

10. The heat exchanger system of claim 9, wherein the interior wall comprises a first channel extending transverse to the flow path, the shelf comprises a second channel extending transverse to the flow path, and the first channel and the second channel receive the shield.

11. The heat exchanger system of claim 9, wherein the shelf comprises an interface surface configured to engage with the heat exchanger, receive the condensate from the heat exchanger, and direct the condensate into the trough.

12. A drain pan for a heating, ventilation, and/or heating (HVAC) system, comprising:
    a shelf and an interior wall cooperatively forming a trough defining a flow path configured to direct condensate therethrough, wherein the shelf comprises a surface;
    a base surface within the trough, wherein the base surface is configured to direct the condensate along the flow path, and the surface of the shelf is angled toward the base surface; and
    a shield positioned in the flow path and extending across the trough from the shelf to the interior wall, wherein the shield comprises:
        an edge configured to abut the base surface;
        a notch formed in the edge of the shield, wherein the notch extends from the edge into a body of the shield, and the flow path extends through the notch; and a gate coupled to the body, wherein the gate is movable relative to the body to adjust an overlap with the notch and to adjust a flow of the condensate through the notch.

13. The drain pan of claim 12, wherein the edge is a first edge, the shield comprises a second edge configured to engage with the interior wall, and the shield comprises a third edge configured to engage with the shelf.

14. The drain pan of claim 12, wherein the shelf and the interior wall comprise respective curved surfaces that extend to the base surface, and the edge comprises arcuate portions configured to engage with the respective curved surfaces of the shelf and the interior wall.

15. The drain pan of claim 12, wherein the shield is integrally formed with the shelf and the interior wall.

16. The drain pan of claim 12, wherein the interior wall is a first interior wall and the trough is a first trough, the drain pan comprises a second interior wall and an exterior wall cooperatively forming a second trough defining the flow path, and the drain pan comprises a discharge opening formed through the exterior wall such that the drain pan is configured to direct the condensate along the flow path from the first trough, to the second trough, and through the discharge opening.

17. The drain pan of claim 16, comprising a plurality of troughs comprising the trough, wherein the plurality of troughs cooperatively define a duct opening, and the duct opening is configured to receive an air flow.

\* \* \* \* \*